(12) United States Patent
Kakuda et al.

(10) Patent No.: US 8,887,700 B2
(45) Date of Patent: Nov. 18, 2014

(54) DIESEL ENGINE FOR VEHICLE

(75) Inventors: Yoshie Kakuda, Hiroshima (JP);
Takeshi Yokoo, Hiroshima (JP);
Daisuke Shimo, Hroshima (JP);
Kyotaro Nishimoto, Hiroshima (JP);
Kim Sangkyu, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 558 days.

(21) Appl. No.: 13/310,518

(22) Filed: Dec. 2, 2011

(65) Prior Publication Data

US 2012/0167858 A1   Jul. 5, 2012

(30) Foreign Application Priority Data

Jan. 5, 2011   (JP) ................... 2011-000396

(51) Int. Cl.
| | |
|---|---|
| F02B 47/08 | (2006.01) |
| F02M 25/07 | (2006.01) |
| F02D 41/00 | (2006.01) |
| F02M 31/08 | (2006.01) |
| F02M 31/06 | (2006.01) |
| F02B 3/06 | (2006.01) |
| F02M 31/13 | (2006.01) |
| F02D 13/02 | (2006.01) |
| F02B 29/04 | (2006.01) |

(52) U.S. Cl.
CPC .......... *F02M 25/0747* (2013.01); *F02M 31/08* (2013.01); *F02M 31/06* (2013.01); *F02B 2275/14* (2013.01); *F02B 3/06* (2013.01); *F02M 25/0713* (2013.01); *Y02T 10/47* (2013.01); *F02M 25/0752* (2013.01); *F02M 31/13* (2013.01); *F02D 41/0072* (2013.01); *F02D 13/0215* (2013.01); *F02B 29/0406* (2013.01); *F02M 25/0711* (2013.01)
USPC ............................. 123/568.11; 123/568.14

(58) Field of Classification Search
CPC .............................. F02M 31/06; F02M 31/08
USPC .......................................... 123/568.11, 568.14
See application file for complete search history.

(56) References Cited

U.S. PATENT DOCUMENTS

| | | | | |
|---|---|---|---|---|
| 7,628,145 B2* | 12/2009 | Ishibashi et al. | .......... | 123/568.11 |
| 2005/0081836 A1* | 4/2005 | Winsor | .................... | 123/568.14 |

(Continued)

FOREIGN PATENT DOCUMENTS

| | | |
|---|---|---|
| JP | 2007-040218 A | 2/2007 |
| JP | 2008-261236 A | 10/2008 |

*Primary Examiner* — Hieu T Vo
*Assistant Examiner* — Sherman Manley
(74) *Attorney, Agent, or Firm* — Alleman Hall McCoy Russell & Tuttle LLP

(57) ABSTRACT

The disclosure provides a diesel engine, which includes an engine body mounted in a vehicle and having a cylinder to be supplied with fuel containing diesel fuel as its main component, a geometric compression ratio $\epsilon$ of the cylinder being set within a range of 12:1 to 15:1, and an EGR system for allowing a part of burned gas to exist inside of the engine body cylinder when the engine body is at least in a particular operating state where an engine load and an engine speed are relatively low. The EGR system includes an EGR passage at least partially formed inside the engine body, and having a predetermined or shorter passage, an EGR control valve provided in a course of the EGR passage and for adjusting a flow rate of the burned gas inside the EGR passage, and a controller for controlling an opening of the EGR control valve.

12 Claims, 7 Drawing Sheets

(56) References Cited

U.S. PATENT DOCUMENTS

2008/0162020 A1* 7/2008 Itoga et al. .................. 701/108
2009/0025697 A1* 1/2009 Hatamura ................ 123/568.11
2011/0315128 A1* 12/2011 Yokoo et al. ............. 123/568.11
2012/0167858 A1* 7/2012 Kakuda et al. ............. 123/27 R

* cited by examiner

DIESEL ENGINE FOR VEHICLE

BACKGROUND

The present invention relates to a diesel engine for a vehicle, and particularly relates to a diesel engine with a comparatively low compression ratio in which its geometric compression ratio is set within a range of 12:1 to 15:1.

In diesel engines that are supplied with fuel, of which a main component is diesel fuel, into cylinders and perform combustion by the fuel being compressed to cause a self-ignition, a comparatively low compression ratio in which a geometric compression ratio is, for example, 15:1 or lower is set in order to achieve, for example, a reduction of a discharge amount of NOx. That is, the low compression ratio reduces a speed of the combustion in each of the cylinders and suppresses generation of NOx (see JP2008-261236A). Further, because the lowered compression ratio of the engine reduces a mechanical resistance loss, it is also beneficial in improving a thermal efficiency of the engine.

However, when the geometric compression ratio of the diesel engine is set low, a temperature of the engine at the end of compression stroke is decreased corresponding to the low compression ratio. Therefore, self-ignition conditions become difficult to be met within, for example, an operating range where an engine load and an engine speed are low. Further, in particular, in the diesel engine disclosed in JP2008-261236A, an ignition performance degrades as a cetane number becomes lower depending on a property of fuel to be supplied. Therefore, when these factors relating to the operating conditions of the engine and the property of the fuel are combined, the self-ignition conditions further become difficult to be met. In association with the above, JP2008-261236A discloses a control of improving a starting performance of the engine by estimating the cetane number of the fuel when the engine is started and, according to the estimation result, changing a temperature of a glow plug and a fuel injection timing.

Further, JP2007-040218A discloses an art for increasing, when a compression ratio of a spark-ignition engine, which performs ignition combustion on the compression stroke, decreases due to a degradation of a compression system thereof, an internal EGR amount by advancing closing timings of exhaust valves, and thereby, increasing a temperature inside cylinders to secure ignitability therein.

As described above, in achieving the lowered compression ratio with the diesel engine, surely securing the ignitability of the fuel regardless of the operating conditions of the engine and the property of the fuel to be supplied is important.

The present invention is made in view of the above situations and surely secures a fuel ignitability in a diesel engine particularly with a low compression ratio, which is for mounting on an automobile.

SUMMARY

The diesel engine of the invention, with a comparatively low compression ratio in which a geometric compression ratio is set within a range of 12:1 to 15:1, is configured in that, within an operating range where an engine load and an engine speed are low, temperatures inside cylinders at an end of the compression stroke are increased by allowing burned gas to exist inside the cylinders. In view of the minimum increase in temperature required within the cylinders at the end of the compression stroke so as to satisfy self-ignition conditions, an existing amount of the burned gas inside the cylinders, which can achieve the minimum increase amount in the temperatures at the end of the compression stroke, is specified by an EGR ratio when using external EGR gas and closing timings of the exhaust valves when using internal EGR gas.

According to one aspect of the invention, a diesel engine for a vehicle is provided, which includes an engine body to be mounted in the vehicle and having a cylinder to be supplied with fuel containing diesel fuel as its main component, a geometric compression ratio $\epsilon$ of the cylinder being set within a range of 12:1 to 15:1, and an EGR system for allowing a part of burned gas to exist inside the cylinder of the engine body when the engine body is at least in a particular operating state where an engine load and an engine speed are relatively low.

The EGR system includes an EGR passage at least partially formed inside the engine body, for re-circulating into an intake passage a part of the burned gas inside an exhaust passage, and having a predetermined or shorter passage length, an EGR control valve provided in the course of the EGR passage and for adjusting a flow rate of the burned gas inside the EGR passage, and a controller for controlling an opening of the EGR control valve. In the particular operating state, the engine body is operated so that a relation between a mass of total gas (G) inside the cylinder and a mass of the fuel (F) to be supplied inside the cylinder (G/F) satisfies $30 \leq G/F \leq 60$. When the engine body is in the particular operating state, the controller controls the opening of the EGR control valve so that an EGR ratio [%] defined by a volume ratio of the burned gas with respect to the entire gas inside the cylinder (burned gas amount/total gas amount inside the cylinder) satisfies, $$(10-\alpha) \times (15-\epsilon) + 20 - \alpha \leq \text{EGR ratio} \leq 60 [\%] \qquad (1)$$

(here, $\alpha = 0.2 \times$ external temperature [° C.])
with respect to the geometric compression ratio $\epsilon$ of the engine body.

The EGR ratio may be calculated as follows:

$$\text{EGR ratio} = CO_2 \text{ concentration in intake air} / CO_2 \text{ concentration in exhaust gas} \times 100 [\%].$$

Moreover, the G/F (the mass of the total gas (burned gas+ new air) inside the cylinder/the mass of the fuel to be supplied to the cylinder) is one of the parameters relating to the cylinder internal temperature (combustion temperature) and the EGR ratio, and the setting of the G/F to be within 30 to 60, that is around 45, is suitable considering, for example, the exhaust emission performance of soot and NOx. Note that, setting the G/F to be around 45 corresponds to setting an excess air ratio $\lambda$ to be slightly leaner than $\lambda = 1.1$.

Thus, in Statement (1), the part for obtaining the minimum value of the EGR ratio, $(10-\alpha) \times (15-\epsilon) + 20 - \alpha$, is a minimum value of the EGR ratio required to satisfy the self-ignition conditions with respect to the geometric compression ratio $\epsilon$ of the engine body and, by setting the EGR ratio higher than the minimum value, the minimum amount of the required burned gas (the external EGR gas) is introduced into the cylinder and the temperature of the cylinder at the end of the compression stroke is increased to an extent to satisfy the self-ignition conditions.

Here, the self-ignition conditions set for establishing Statement (1) are desirably set with respect to fuel with the worst ignitability, and Statement (1) is calculated by assuming that the fuel with the lowest cetane number to be used for the engine (cetane number=40) is used. Thereby, the self-ignition conditions can be satisfied as long as Statement (1) is satisfied even when the fuel with the lowest cetane number is used. Note that, when fuel with a comparatively higher cetane number is used, naturally the self-ignition conditions are satisfied by satisfying Statement (1).

Moreover, when an external ambient temperature T is set to be constant (i.e., α is a constant value), the minimum value obtained based on Statement (1) decreases as the geometric compression ratio ε is higher, and the minimum value increases as the geometric compression ratio ε is lower. That is, because the temperature of the cylinder at the end of the compression stroke increases as the geometric compression ratio ε is higher, a minimum increase amount of temperature of the cylinder at the end of the compression stroke, which is required to satisfy the self-ignition conditions, decreases, and therefore, the amount of the burned gas to be introduced into the cylinders decreases. On the other hand, because the temperature of the cylinder at the end of the compression stroke decreases as the geometric compression ratio ε is lower, the minimum increase amount of temperature of the cylinder at the end of the compression stroke, which is required to satisfy the self-ignition conditions, increases, and therefore, the amount of the burned gas to be introduced into the cylinders needs to be increased.

Further, the value of 60% as the maximum value of the EGR ratio is set for a case where the engine body is operated with the excess air ratio λ=1.1 with a load variation of the engine body due to, for example, acceleration taken into account. That is, when the EGR ratio is set to be comparatively high so as to exceed 60%, the excessive amount of the burned gas is introduced into the cylinder and the required amount of new air to satisfy the excess air ratio λ=1.1 cannot flow into the cylinders.

Thus, by setting the EGR ratio to satisfy Statement (1), in the particular operating state, where the engine load and the engine speed are low, including when starting the engine, even if the fuel with low ignitability is used, the ignitability of the fuel can be surely secured. Thereby, the diesel engine with the comparatively low compression ratio in which the geometric compression ratio is set within the range of 12:1 to 15:1 is achieved. The diesel engine with the low compression ratio has a significantly reduced NOx discharge amount due to a slow combustion, and thereby, has a high exhaust emission performance and further, by an improved thermal efficiency according to a reduced mechanical resistance loss, has an excellent fuel consumption.

Here, in this configuration, at least part of the EGR passage is formed within the engine body. Thereby, this configuration is advantageous in suppressing a release of heat from the burned gas while flowing through the EGR passage. This allows the burned gas with the highest possible temperature to be introduced into the cylinder and is advantageous in increasing the temperature of the cylinder at the end of the compression stroke. That is, in the engine with the low geometric compression ratio, it is advantageous in surely securing the ignitability in the particular operating range where the engine load and the engine speed are low. Meanwhile, for example, in the conventional configuration where the EGR passage is exposed outside the engine body, the release amount of heat from the burned gas is large while flowing through the EGR passage and the temperatures of the burned gas to be introduced into the cylinders are decreased, thereby, it is disadvantageous in increasing the temperature of the cylinder at the end of the compression stroke. As a result thereof, the engine with the low compression ratio cannot secure the ignitability only by setting the EGR ratio as described above.

In regard to the release amount of heat, when the geometric compression ratio ε is fixed, the minimum value of the EGR ratio based on Statement (1) decreases as the external ambient temperature T is higher, and the minimum value increases as the external ambient temperature T is lower. That is, as the external ambient temperature T decreases, the temperature of the new air to be introduced into the cylinder is decreased as well as the release amount of heat from the burned gas while flowing through the EGR passage is increased, thereby, the temperature of the burned gas to be introduced into the cylinder easily decreases. This is disadvantageous regarding the ignitability. In such a case where the burned gas is introduced into the cylinder via the EGR passage, in other words, where the external EGR gas is used, the external ambient temperature T greatly influences when the EGR ratio is set so as to secure the ignitability, therefore, in controlling the EGR ratio, the external ambient temperature T is desirably considered as one of the parameters as in Statement (1).

A part of the exhaust passage may be formed inside the engine body, and the EGR passage may be connected with the exhaust passage formed inside the engine body. Here, the "exhaust passage" may include, needless to say, exhaust ports formed within a cylinder head of the engine body, and, for example, an exhaust manifold for merging the exhaust ports formed in the cylinder head.

In these configurations, part of the exhaust passage and part of the EGR passage are formed inside the engine body. Thereby, as described above, the release of heat while flowing through the exhaust passage and EGR passage can be further suppressed. This can be further advantageous in increasing the temperature of the cylinder at the end of the compression stroke by introducing burned gas with the highest possible temperature, especially in the engine which has a geometric compression ratio that is comparatively low such that securing the ignitability cannot be achieved with the EGR passage with the convention configuration.

The cylinder of the engine body may include a plurality of cylinders aligned in series. The length of the EGR passage may be set to a length of the cylinders in their aligned direction of the engine body or shorter.

This means that the length of the EGR passage is set to be greatly shorter compared to the EGR passage with the conventional configuration arranged outside of the engine body, and the EGR passage with the shortest possible length is set so as to correspond to the size of the engine body. Therefore, it is advantageous in increasing the temperature of the cylinder at the end of the compression stroke by suppressing the release of heat from the burned gas while flowing through the EGR passage.

According to another aspect of the invention, a diesel engine for a vehicle is provided The EGR system includes an exhaust valve provided between an exhaust passage and the cylinder, and a controller for controlling opening and closing timings of the exhaust valve, and the controller sets the closing timing of the exhaust valve to be during an exhaust stroke that is advanced by a predetermined crank angle from its top dead center, so as to leave the part of the burned gas inside the cylinder Further, in the particular operating state, the engine body is operated so that a relation between a mass of total gas (G) inside the cylinder and a mass of the fuel (F) to be supplied inside the cylinder (G/F) satisfies 30≤G/F≤60. When the engine body is in the particular operating state, the controller controls the closing timing θ [BTDC°CA] of the exhaust valve to satisfy, $$16\times(15-\epsilon)+20\leq\theta\leq80[BTDC°CA] \qquad (2)$$

with respect to the geometric compression ratio ε of the engine body.

Here, the closing timing of the exhaust valve may be defined as, in a lift curve of the exhaust valve partitioned into an open ramp part, a bell curve part, and a close ramp part, a switching point between the bell curve part and the close ramp part. More specifically, a lift point of 0.5 mm may be set as the closing timing of the exhaust valve.

As the closing timing θ of the exhaust valve in Statement (2) becomes earlier (as the value of θ indicated by the crank angle [deg] before a top dead center on the compression stroke becomes larger), a negative overlap period in which the intake and exhaust valves are both closed on the exhaust and intake strokes becomes longer and the amount of the burned gas remaining within the cylinder is increased. That is, the EGR system in this configuration is configured to adjust the EGR ratio by using an internal EGR gas. Satisfying the relation equation (2) corresponds to setting the closing timing θ of the exhaust valve earlier than a predetermined timing and leaving over a predetermined amount of burned gas, and thereby, the temperature of the cylinder at the end of the compression stroke is increased and the self-ignition conditions are satisfied.

Further, in Statement (1), the part for obtaining a minimum value of the closing timing θ of the exhaust valve, $16\times(15-\epsilon)+20$, is a minimum value required to satisfy the self-ignition conditions with respect to the geometric compression ratio $\epsilon$ of the engine body. By setting the closing timing θ of the exhaust valve higher than the minimum value, the minimum amount of required gas is left inside the cylinder and the temperature of the cylinder at the end of the compression stroke is increased so as to satisfy the self-ignition conditions.

Similar to the minimum value of the EGR ratio based on Statement (1), the minimum value of the closing timing θ based on Statement (2) has a characteristic in that it becomes smaller as the geometric compression ratio $\epsilon$ becomes larger, and becomes larger as geometric compression ratio $\epsilon$ becomes smaller. Further, the value 80 [BTDC°CA] as the maximum value of the closing timing θ based on Statement (2) is set as a maximum value thereof in a case where the engine body is operated with the excess air ratio λ=1.1.

As above, by the controller controlling the closing timing of the exhaust valve so as to satisfy Statement (2), in the particular operating state where the engine load and the engine speed are low, including when starting the engine, even when the fuel with low ignitability is used, the ignitability of the fuel can be surely secured. Similar to the above description, this achieves a diesel engine with a comparatively low compression ratio in which its geometric compression ratio is set within a range of 12:1 to 15:1, and a NOx discharge amount of the diesel engine is significantly reduced due to a slow combustion, and thereby, has a high exhaust emission performance and further, by a thermal efficiency being improved according to a reduced mechanical resistance loss, has a high fuel consumption.

Such an increase of the temperature of the cylinder at the end of the compression stroke by using the internal EGR gas is advantageous in that the release of heat from the burned gas is prevented or suppressed and the influence from the external ambient temperature can be small compared to the case of using the external EGR gas via the above described EGR passage. As a result thereof, as described above, the increase of the temperature by using the internal EGR gas is especially effective for the engine with the comparatively low geometric compression ratio such that an ignitability thereof cannot be secured with a conventional configuration where the EGR passage is arranged outside the engine body.

An exhaust throttle valve may be arranged in the exhaust passage. When the engine body is in the particular operating state and the exhaust throttle valve is closed to a predetermined opening, the controller may control the closing timing θ [BTDC°CA] of the exhaust valve to satisfy, $$10\times(15-\epsilon)+15\leq\theta\leq80[BTDC°CA] \qquad (3)$$

with respect to the geometric compression ratio $\epsilon$ of the engine body.

Here, the phrase "the exhaust throttle valve is closed to a predetermined opening" means that the opening of the throttle valve is controlled to an extent that the exhaust gas leaks therefrom, and it may be referred to as, in other words, "the exhaust throttle valve is partially opened". Moreover, it may be defined such that the throttle valve is partially opened so that the back pressure of the engine body is higher than the back pressure thereof when the throttle valve is fully opened (or the throttle valve is not provided) and lower than a theoretical critical pressure on the exhaust side.

According to this configuration, because the back pressure of the engine body is increased by closing the exhaust throttle valve, for example, even in a case where the exhaust valve is closed at the same timing, when the exhaust throttle valve is closed, the amount of the burned gas remaining inside the cylinder increases compared to when the exhaust throttle valve is not closed or the exhaust throttle valve does not exist, and therefore, the EGR ratio increases. That is, when comparing Statements (2) and (3), the minimum value of the closing timing based on Statement (3) can be smaller. This can be further advantageous in the engine body with the comparatively low geometric compression ratio. In other words, as described above, the required minimum EGR ratio becomes higher as the geometric compression ratio of the engine body becomes smaller and the exhaust valve is required to be closed earlier. However, a maximum advancing amount of the closing timing of the exhaust valve may be restricted to a predetermined amount according to, for example, a characteristic of a shape of a combustion chamber and a characteristic of a mechanism for changing the closing timing of the exhaust valve. In such a case, retarding the closing timing of the exhaust valve by closing the exhaust throttle valve leaves the required amount of the burned gas inside the cylinder without a regulation of the closing timing and secures the ignitability even in the engine with a comparatively low compression ratio.

According to another aspect of the invention, a method of controlling an EGR ratio of a diesel engine for a vehicle is provided. The engine includes an engine body to be mounted in the vehicle and having a cylinder to be supplied with fuel containing diesel fuel as its main component, a geometric compression ratio $\epsilon$ of the cylinder being set within a range of 12:1 to 15:1, and an EGR system for allowing a part of burned gas to exist inside the cylinder of the engine body when the engine body is at least in a particular operating state where an engine load and an engine speed are relatively low. The EGR system includes an EGR passage at least partially formed inside the engine body, for re-circulating into an intake passage a part of the burned gas inside an exhaust passage, and having a predetermined or shorter passage length, an EGR control valve provided in the course of the EGR passage and for adjusting a flow rate of the burned gas inside the EGR passage, and a controller for controlling an opening of the EGR control valve. The method includes operating the engine body in the particular operating state so that a relation between a mass of total gas (G) inside the cylinder and a mass of the fuel (F) to be supplied inside the cylinder (G/F) satisfies 30≤G/F≤60, and when the engine body is in the particular operating state, causing the controller to control the opening of the EGR control valve so that an EGR ratio [%] defined by a volume ratio of the burned gas with respect to the entire gas inside the cylinder (burned gas amount/total gas amount inside the cylinder) satisfies, $$(10-\alpha)\times(15-\epsilon)+20-\alpha \leq \text{EGR ratio} \leq 60 [\%]$$

(here, $\alpha=0.2\times$external temperature [° C.])
with respect to the geometric compression ratio $\epsilon$ of the engine body.

The EGR ratio may be calculated as follows:

$$\text{EGR ratio}=CO_2 \text{ concentration in intake air}/CO_2 \text{ concentration in exhaust gas}\times 100 [\%].$$

A part of the exhaust passage may be formed inside the engine body. The EGR passage may be connected with the exhaust passage formed inside the engine body.

The cylinder of the engine body may include a plurality of cylinders aligned in series. The length of the EGR passage may be set to a length of the cylinders in their aligned direction of the engine body or shorter.

According to another aspect of the invention, a method of controlling an EGR ratio of a diesel engine for a vehicle is provided. The engine includes an engine body to be mounted in the vehicle and having a cylinder to be supplied with fuel containing diesel fuel as its main component, a geometric compression ratio $\epsilon$ of the cylinder being set within a range of 12:1 to 15:1, and an EGR system for allowing a part of burned gas to exist inside the cylinder of the engine body when the engine body is at least in a particular operating state where an engine load and an engine speed are relatively low. The EGR system includes an exhaust valve provided between an exhaust passage and the cylinder, and a controller for controlling opening and closing timings of the exhaust valve, and wherein the controller sets the closing timing of the exhaust valve to be during an exhaust stroke that is advanced by a predetermined crank angle from its top dead center, so as to leave the part of the burned gas inside the cylinder. The method includes operating the engine body in the particular operating state so that a relation between a mass of total gas (G) inside the cylinder and a mass of the fuel (F) to be supplied inside the cylinder (G/F) satisfies $30 \leq G/F \leq 60$. When the engine body is in the particular operating state, causing the controller to control the closing timing $\theta$ [BTDC°CA] of the exhaust valve to satisfy, $$16\times(15-\epsilon)+20 \leq \theta \leq 80 [\text{BTDC°CA}]$$

with respect to the geometric compression ratio $\epsilon$ of the engine body.

An exhaust throttle valve is arranged in the exhaust passage. When the engine body is in the particular operating state and the exhaust throttle valve is closed to a predetermined opening, the controller controls the closing timing $\theta$ [BTDC°CA] of the exhaust valve to satisfy, $$10\times(15-\epsilon)+15 \leq \theta \leq 80 [\text{BTDC°CA}]$$

with respect to the geometric compression ratio $\epsilon$ of the engine body.

DESCRIPTION OF THE EMBODIMENTS

Hereinafter, a diesel engine according to embodiments of the present invention is described in detail with reference to the appended drawings. Note that, the following description of the preferred embodiments is merely an illustration.

First Embodiment

Figure 1:
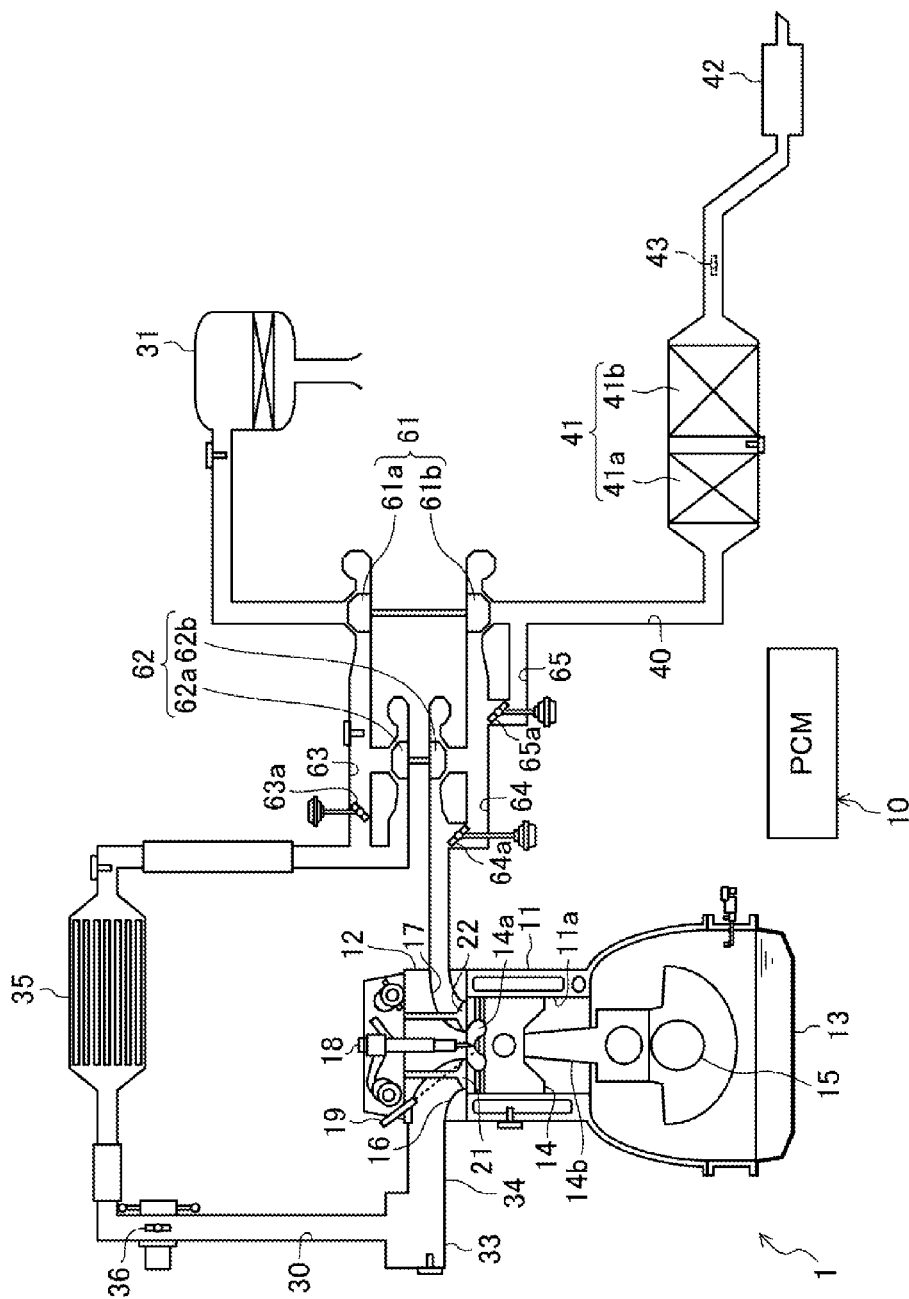
FIG. 1 is a schematic diagram showing a configuration of a diesel engine.
Figure 2:
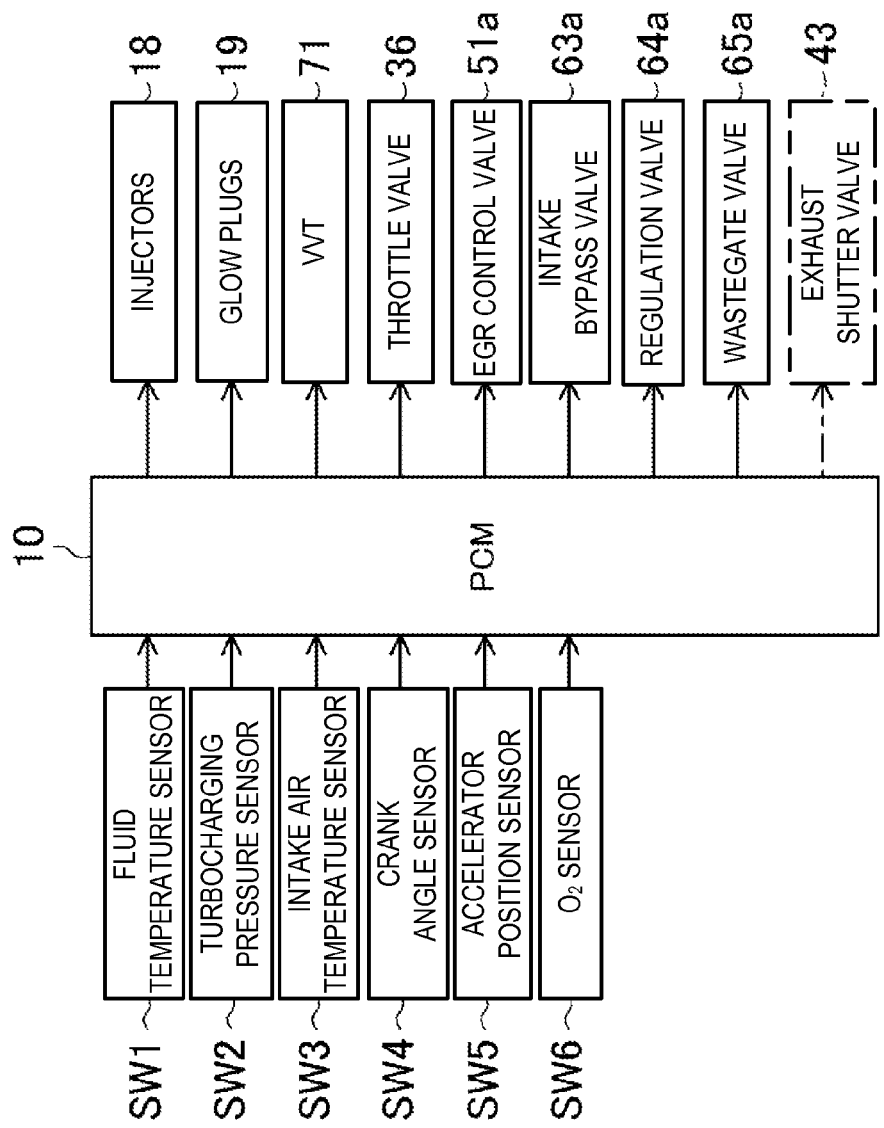
FIG. 2 is a block diagram relating to a control of the diesel engine.
Figure 3:
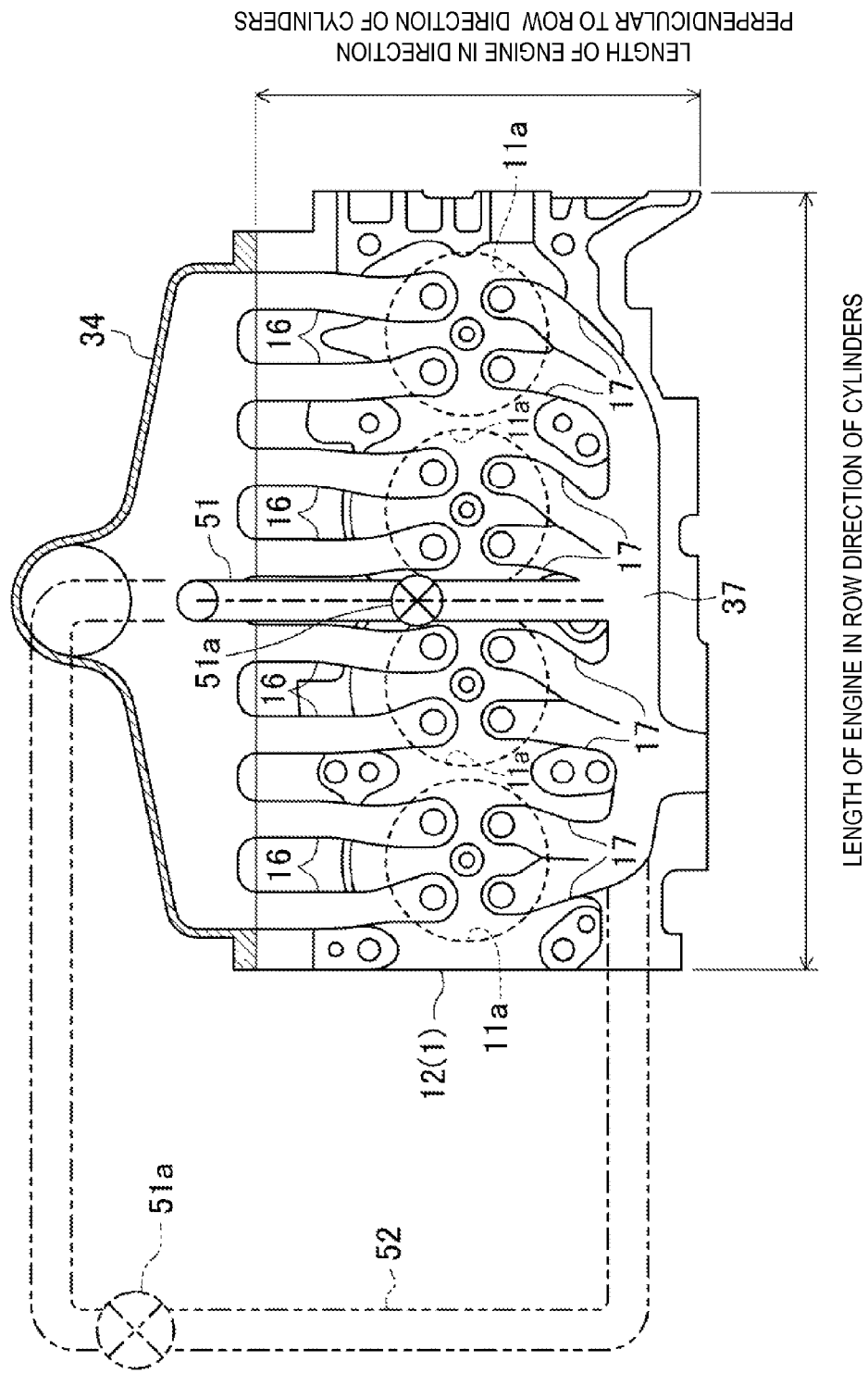
FIG. 3 is a schematic plan view illustrating an EGR passage formed within a cylinder head of the engine.

FIGS. 1 and 2 show schematic configurations of an engine 1 of the first embodiment. The engine 1 is a diesel engine that is mounted in a vehicle and supplied with fuel of which a main component is diesel fuel. The diesel engine includes a cylinder block 11 provided with a plurality of cylinders 11a (only one cylinder is illustrated), a cylinder head 12 arranged on the cylinder block 11, and an oil pan 13 arranged below the cylinder block 11 and where a lubricant is stored. Although, as shown in FIG. 3, the engine 1 of this embodiment is an inline-four engine where four of the first to fourth cylinders 11a are arranged in series, it is not limited to the inline-four engine. Inside the cylinders 11a of the engine 1, reciprocating pistons 14 are fitted, and cavities partially forming reentrant combustion chambers 14a are formed on top surfaces of the pistons 14, respectively. Each of the pistons 14 is coupled to a crank shaft 15 via a connecting rod 14b.

In the cylinder head 12, intake ports 16 and exhaust ports 17 are formed, and intake valves 21 for opening and closing the openings of the intake ports 16 on the combustion chamber 14a side and exhaust valves 22 for opening and closing the openings of the exhaust ports 17 on the combustion chamber 14a side are arranged for each of the cylinders 11a. As schematically shown in FIG. 3, each of the cylinders 11a is formed with two openings of the intake ports 16 and two openings of the exhaust ports 17, that is, each of the cylinders 11a is arranged with two intake valves 21 and two exhaust valves 22. Within a valve train system of the engine 1 for operating the intake and exhaust valves 21 and 22 (the illustration thereof is omitted in FIG. 1), an intake variable valve timing mechanism (Variable Valve Timing: VVT), which is actuated hydraulically or mechanically, for changing opening and closing timings of the intake valves 21 is provided on the intake valve side. Another VVT, which is actuated hydraulically or mechanically, for changing opening and closing timings of the exhaust valves 22 is similarly provided on the exhaust valve side (see the reference numeral 71).

Injectors 18 for injecting the fuel and glow plugs 19 for improving an ignitability of the fuel by heating intake air under a cold state of the engine 1 are provided within the cylinder head 12. The injectors 18 are arranged so that fuel injection ports thereof face the combustion chambers 14a from ceiling surfaces of the combustion chambers 14a, respectively, and the injectors 18 supply the fuel to the combustion chambers 14a by directly injecting the fuel at a timing near a top dead center in compression stroke.

An intake passage 30 is connected with a side surface of the engine 1 so as to communicate with the intake ports 16 of the cylinders 11a. Meanwhile, an exhaust passage 40 for discharging burned gas (i.e., exhaust gas) from the combustion chambers 14a of the cylinders 11a is connected with the other side surface of the engine 1. A large turbocharger 61 and a compact turbocharger 62 for turbocharging the intake air (described in detail below) are arranged in the intake and exhaust passages 30 and 40.

An air cleaner 31 for filtering the intake air is arranged in an upstream end part of the intake passage 30. A surge tank 33 is arranged near a downstream end of the intake passage 30. A part of the intake passage 30 on the downstream side of the surge tank 33 is branched to be independent passages extending toward the respective cylinders 11a, and downstream ends of the independent passages are connected with the intake ports 16 of the cylinders 11a. The surge tank 33 and the independent passages are formed within an intake manifold 34 attached to a side surface of the engine (also see FIG. 3).

A compressor 61a of the large turbocharger 61, a compressor 62a of the compact turbocharger 62, an intercooler 35 for cooling air compressed by the compressors 61a and 62a, and a throttle valve 36 for adjusting an amount of the intake air flowing into the combustion chambers 14a of the cylinders 11a are arranged in the intake passage 30 between the air cleaner 31 and the surge tank 33. The throttle valve 36 is basically fully opened; however, it is fully closed when the engine 1 is stopped so as to prevent a shock.

While the intake side has the configuration as above, a part of the exhaust passage 40 on the upstream side is constituted with exhaust ports 17 branched out to each of the cylinders 11a, an exhaust manifold 37 having independent passages connected with the respective exhaust ports 17, and a merging part where the independent passages merge together. As shown in FIG. 3, the exhaust manifold 37 of this embodiment is formed within the cylinder head 12 of the engine 1.

In a part of the exhaust passage 40 downstream of the exhaust manifold 37, a turbine 62b of the compact turbocharger 62, a turbine 61b of the large turbocharger 61, an exhaust emission control device 41 for purifying hazardous components contained in the exhaust gas, and a silencer 42 are arranged in this order from the upstream.

The exhaust emission control device 41 includes an oxidation catalyst 41a and a diesel particulate filter 41b (hereinafter, referred to as the filter), and these components are arranged in this order from the upstream. The oxidation catalyst 41a and the filter 41b are accommodated in a case. The oxidation catalyst 41a has an oxidation catalyst carrying, for example, platinum or platinum mixed with palladium and promotes a reaction generating $CO_2$ and $H_2O$ by oxidizing CO and HC contained in the exhaust gas. The filter 41b catches particulates such as soot contained in the exhaust gas from the engine 1. Note that the filter 41b may be coated with the oxidation catalyst. As described later, the generation of NOx is significantly suppressed or eliminated in the engine 1 because of the low compression ratio, therefore the NOx catalyst may not need to be used.

The exhaust and intake sides in the engine 1 communicate with each other by an exhaust gas recirculation passage (EGR passage) 51 for circulating a part of the burned gas back to the intake passage 30. The illustration of the EGR passage 51 is omitted in FIG. 1. The EGR passage 51 is formed within the cylinder head 12 of the engine 1. Specifically, as shown in FIG. 3, at substantially the center position of the engine 1 in a row direction of the cylinders, one end of the EGR passage 51 is connected with the exhaust manifold 37 formed within the cylinder head 12. The EGR passage 51 is formed to extend inside the cylinder 12, at a position corresponding to between the second and third cylinders, toward a direction perpendicular to the row direction of the cylinders to reach the intake side. The other end of the EGR passage 51 is positioned within the intake manifold 34 attached to the engine 1. Thereby, a passage length of the EGR passage 51 indicated by the one-dot chain line in FIG. 3 becomes approximately the same as a dimension of the engine 1 in the direction perpendicular to the row direction of the cylinders, and is set to be shorter than a dimension of the engine 1 in the row direction of the cylinders. The passage length of the EGR passage 51 is, as illustrated virtually in FIG. 3, significantly shorter than a conventional EGR passage 52 arranged outside the engine 1. Forming the EGR passage 51 inside the cylinder 12 as above is beneficial in suppressing a release of heat from the burned gas while flowing through the passage and, thereby, the burned gas can be introduced into the cylinders 11a while maintaining a high temperature thereof. Note that, an EGR control valve 51a for adjusting an introducing amount of the burned gas into the cylinders 11a is provided in the midstream of the EGR passage 51.

The large turbocharger 61 has the large compressor 61a arranged in the intake passage 30 and the large turbine 61b arranged in the exhaust passage 40. The large compressor 61a is arranged in the intake passage 30 between the air cleaner 31 and the intercooler 35. The large turbine 61b is arranged in the exhaust passage 40 between the exhaust manifold 37 and the oxidation catalyst 41a.

The compact turbocharger 62 has the compact compressor 62a arranged in the intake passage 30 and the compact turbine 62b arranged in the exhaust passage 40. The compact compressor 62a is arranged in the intake passage 30 downstream of the large compressor 61a. The compact turbine 62b is arranged in the exhaust passage 40 upstream of the large turbine 61b.

That is, the large compressor 61a and the compact compressor 62a are arranged in series in the intake passage 30 in this order from the upstream, and the compact turbine 62b and the large turbine 61b are arranged in series in the exhaust passage 40 in this order from the upstream. The large and compact turbines 61b and 62b are rotated by the flow of the exhaust gas, and the large and compact compressors 61a and 62a coupled with the large and compact turbines 61b and 62b are actuated by the rotations of the large and compact turbines 61b and 62b, respectively.

The compact turbocharger 62 is smaller and the large turbocharger 61 is larger in relation to each other. That is, inertia of the large turbine 61b of the large turbocharger 61 is larger than that of the compact turbine 62b of the compact turbocharger 62.

A small intake bypass passage 63 for bypassing the small compressor 62a is connected with the intake passage 30. A small intake bypass valve 63a for adjusting an amount of the air flowing into the small intake bypass passage 63 is arranged in the small intake bypass passage 63. The small intake bypass valve 63a is fully closed (i.e., normally closed) when no electric power is distributed thereto.

A small exhaust bypass passage 64 for bypassing the small turbine 62b and a large exhaust bypass passage 65 for bypassing the large turbine 61b are connected with the exhaust passage 40. A regulation valve 64a for adjusting an amount of the exhaust gas flowing to the small exhaust bypass passage 64 is arranged in the small exhaust bypass passage 64, and a wastegate valve 65a for adjusting an exhaust gas amount flowing to the large exhaust bypass passage 65 is arranged in the large exhaust bypass passage 65. The regulation valve 64a and the wastegate 65a are both fully opened (i.e., normally opened) when no electric power is distributed thereto.

The diesel engine 1 with the configuration described as above is controlled by a powertrain control module 10 (hereinafter, may be referred to as PCM). The PCM 10 is configured by a CPU, a memory, a counter timer group, an interface, and a microprocessor with paths for connecting these units. The PCM 10 configures a control device. As shown in FIG. 2, the PCM 10 is inputted with detection signals from a fluid temperature sensor SW1 for detecting a temperature of an engine coolant, a turbocharging pressure sensor SW2 attached to the surge tank 33 and for detecting a pressure of the air to be supplied to the combustion chambers 14a, an intake air temperature sensor SW3 for detecting a temperature of the intake air, a crank angle sensor SW4 for detecting a rotational angle of the crank shaft 15, an accelerator position sensor SW5 for detecting an accelerator opening amount corresponding to an angle of an acceleration pedal (not illustrated) of the vehicle, and an $O_2$ sensor SW6 for detecting an oxygen concentration within the exhaust gas. The PCM 10 performs various kinds of calculations based on the detection signals so as to determine the states of the engine 1 and the vehicle, and further outputs control signals to the injectors 18, the glow plugs 19, the VVT 71 of the valve system, and the actuators of the valves 36, 51a, 63a, 64a and 65a according to the determined states.

Thus, the engine 1 is configured to have a comparatively low compression ratio in which its geometric compression ratio is within a range of 12:1 to below 15:1, and thereby, the exhaust emission performance is improved and a thermal efficiency is improved. On the other hand, as a result of setting the geometric compression ratio low, a temperature of the cylinder at the end of the compression stroke is decreased particularly within the operating range where an engine load and an engine speed are low, and therefore, a self ignition may be difficult to perform and self-ignition conditions may not be satisfied depending on the property of the fuel to be supplied to the engine 1 (e.g., fuel with a low cetane number).

Therefore, the engine 1 performs the re-circulation of the burned gas through the EGR passage 51, and thereby, at least within the particular operating state where the engine load and the engine speed are low, a comparatively large amount of external EGR gas is introduced into the cylinder 11a to increase the temperature of the cylinder at the end of the compression stroke. Especially with the low compression ratio engine 1, for surely securing the ignitability of the fuel regardless of operating conditions of the engine and the property of the fuel, an EGR ratio required for securing the ignitability is set according to the geometric compression ratio of the engine 1. Here, the particular operating state where the engine load and the engine speed are low includes when starting the engine 1, and starting the engine includes a time period from the start of the engine 1 until when the engine 1 spins up and the speed thereof stabilizes, and further the fluid temperature of the engine 1 starts to increase (until when the fluid temperature reaches about 40 to 50° C.). Hereinafter, the control of the engine 1 is described in detail with reference to the appended drawings.

Figure 4:
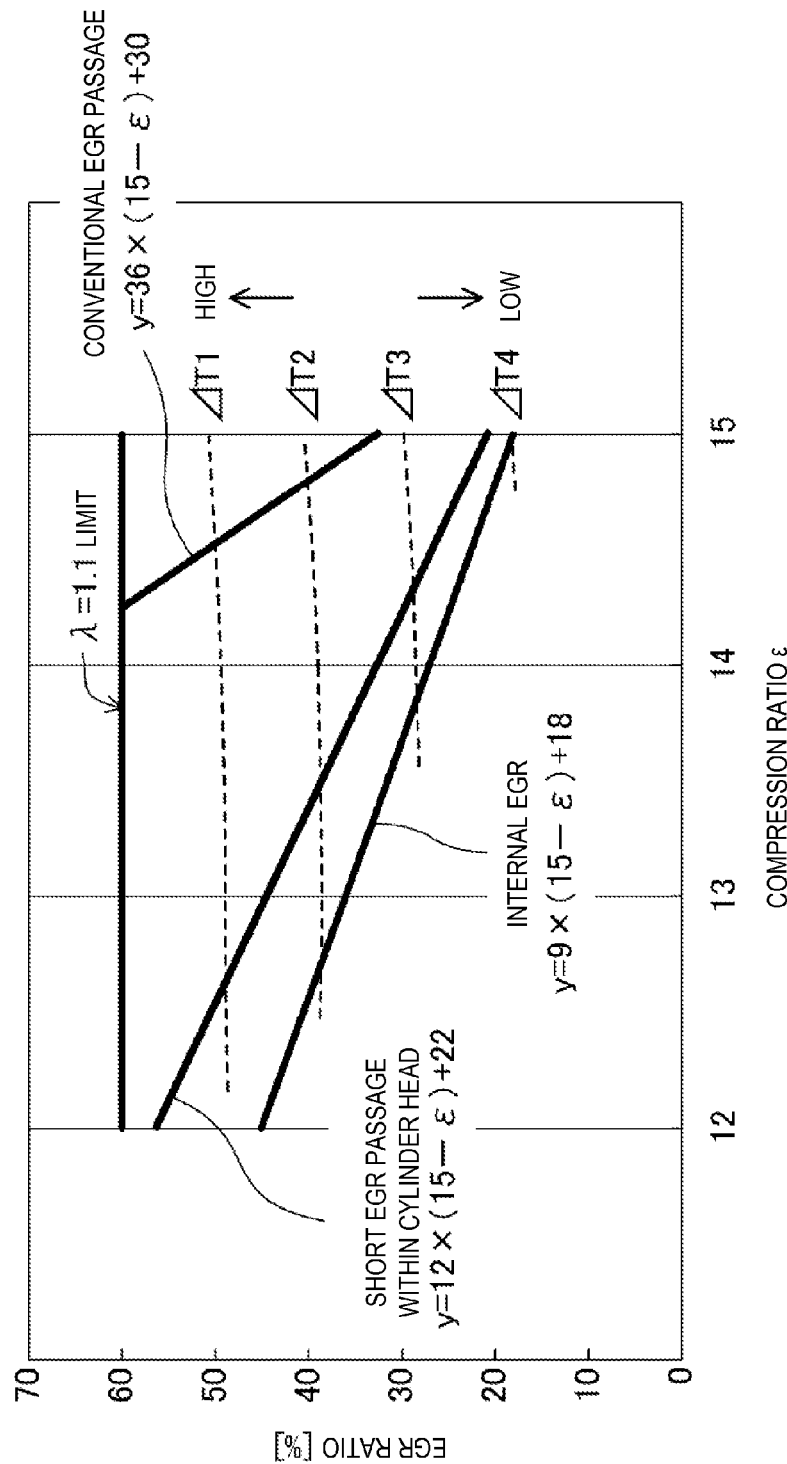
FIG. 4 is a contour chart relating to an increase in temperature of a cylinder at the end of a compression stroke according to a relation between a geometric compression ratio $\epsilon$ and an EGR ratio, and showing relations of the EGR ratio that can satisfy conditions of securing an ignitability with an internal EGR, an external EGR, and an external EGR in the conventional configuration, respectively as examples.
Figure 5:
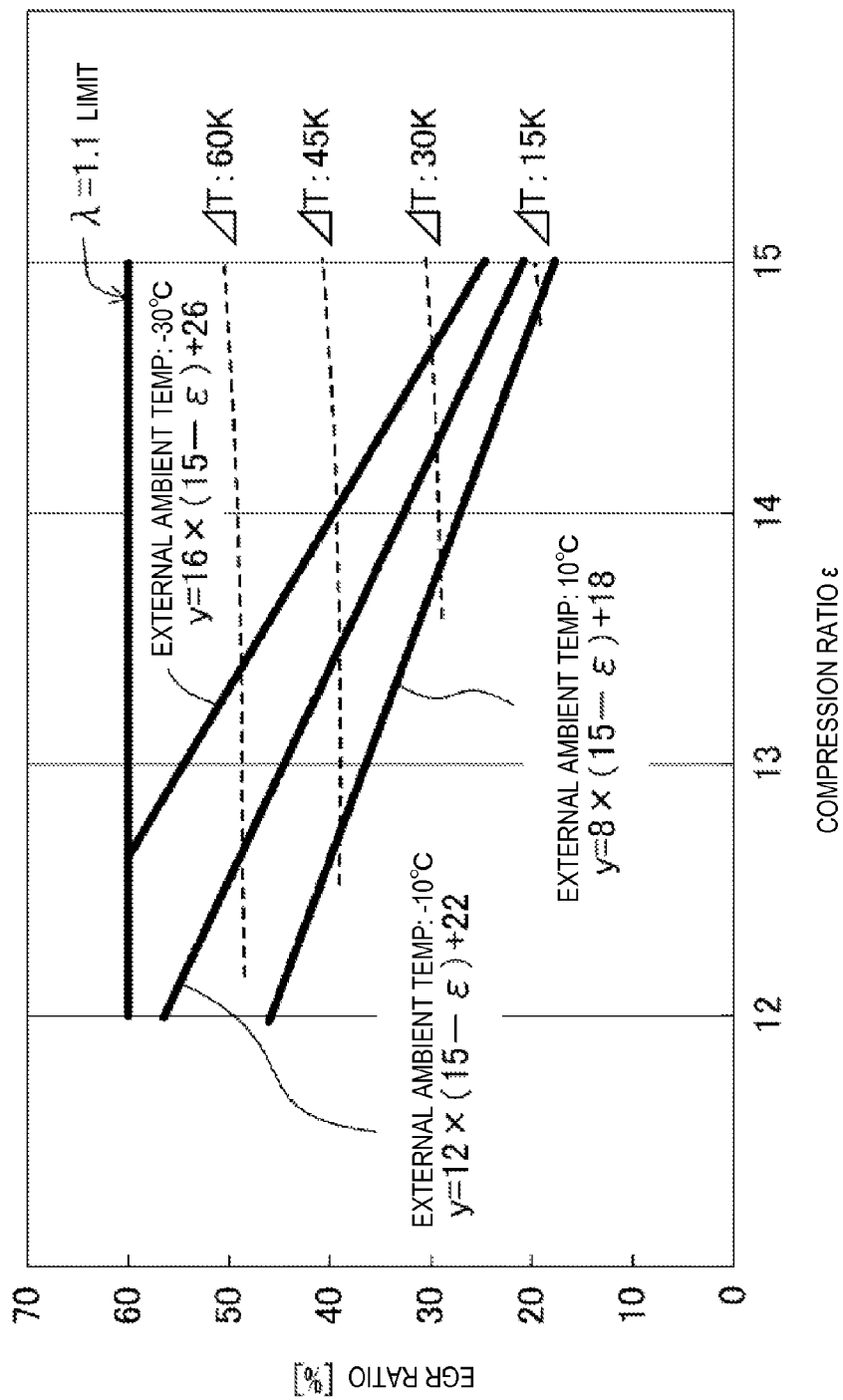
FIG. 5 is a contour chart relating to the increase of the temperature of the cylinder at the end of the compression stroke according to the relation between the geometric compression ratio $\epsilon$ and an EGR ratio, and showing differences when an external ambient temperature changes.
Figure 7:
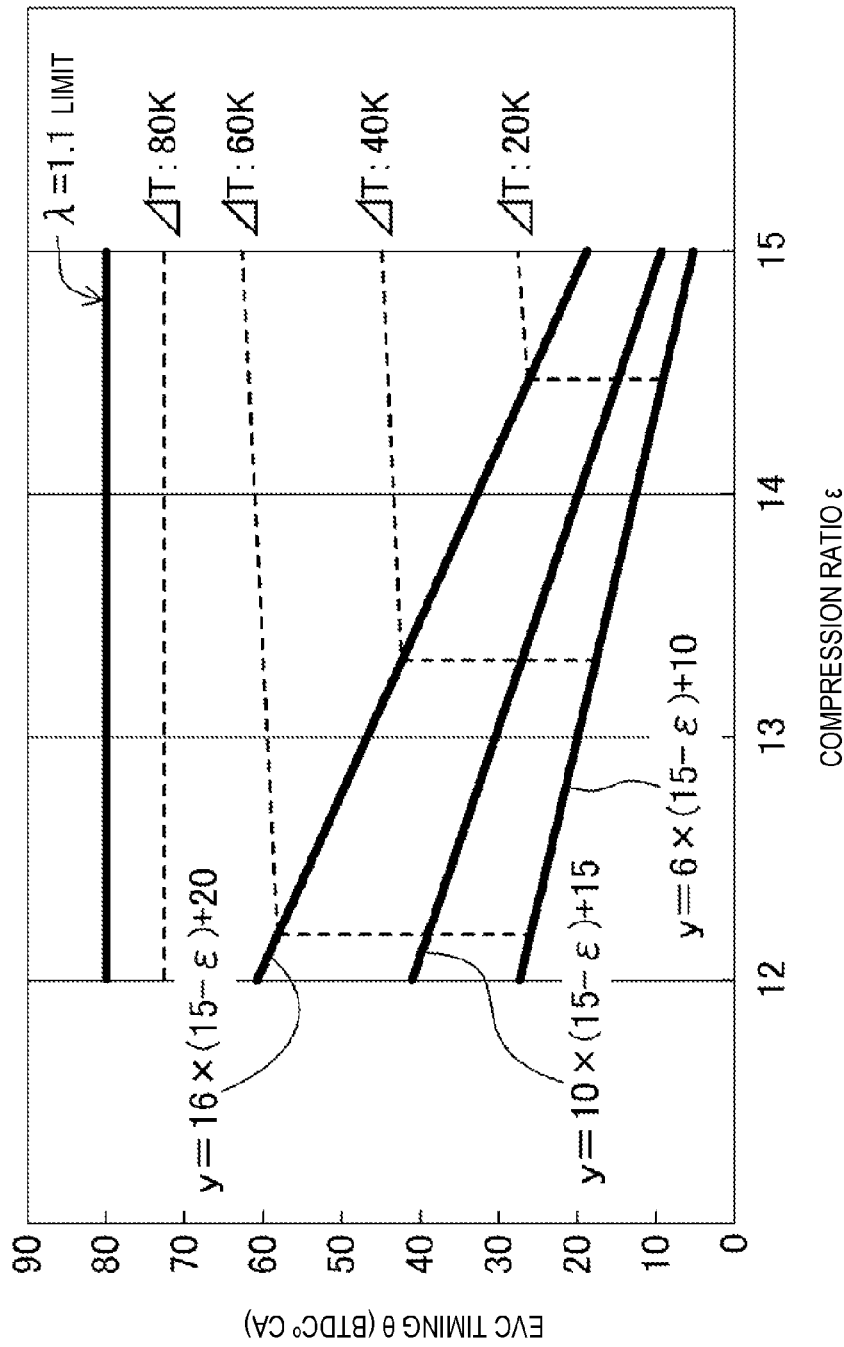
FIG. 7 is a contour chart relating to the increase in temperature of the cylinder at the end of the compression stroke according to a relation between the geometric compression ratio $\epsilon$ and a closing timing of an exhaust valve.

FIG. 4 is a contour chart (isogram chart) relating to an increase amount ($\Delta T$) of the temperature of the cylinder at the end of the compression stroke according to a relation between the geometric compression ratio $\epsilon$ (horizontal axis) and the EGR ratio (note that, the contour charts in FIGS. 4, 5 and 7 show example cases with the cetane number=40 in the fuel). In other words, the contour chart shows the increase amount of the temperature of the cylinder which can be expected according to the setting of the EGR ratio with respect to the geometric compression ratio $\epsilon$ of the engine 1. The chart is obtained by performing estimation-calculations for the temperature of the cylinder at the end of the compression stroke for every geometric compression ratio of the engine 1 under a predetermined operating condition of the engine 1 as described below, while changing the EGR ratio. Basically, the temperature of the cylinder at the end of the compression stroke increases because a ratio of the high temperature burned gas with respect to the entire gas inside the cylinder 11a increases as the EGR ratio increases, and the temperature of the cylinder at the end of the compression stroke decreases as the EGR ratio decreases. The broken lines in FIG. 4 indicate isotherms ($\Delta T1$ to $\Delta T4$) for the increase amount of the temperature. Here, as described below, FIG. 4 includes three exemplary cases: the case of utilizing the internal EGR, the case of utilizing the external EGR by the short EGR passage 51 shown in FIG. 3, and the case of utilizing the external EGR by the conventional EGR passage 52 shown virtually in FIG. 3, and the temperatures indicated by the isotherms of $\Delta T1$ to $\Delta T4$ are different in the respective cases. That is, $\Delta T1$=80K, $\Delta T2$=60K, $\Delta T3$=40K, and $\Delta T4$=20K in the case of utilizing the internal EGR, $\Delta T1$=60K, $\Delta T2$=45K, $\Delta T3$=30K, and $\Delta T4$=15K in the case of utilizing the external EGR by the short EGR passage 51 shown in FIG. 3, and $\Delta T1$=20K, $\Delta T2$=15K, $\Delta T3$=10K, and $\Delta T4$=5K in the case of utilizing the external EGR by the conventional EGR passage 52 shown virtually in FIG. 3.

Thus, each of the thick solid lines in FIG. 4 shows a minimum EGR ratio required to satisfy the self-ignition conditions, under the predetermined operating condition of the engine 1 where the engine load and the engine speed are comparatively low (corresponding to the particular operating state). First, as a reference example, Equation (4a):

$$y=9\times(15-\epsilon)+18 \tag{4a}$$

is for obtaining the minimum value of the EGR ratio which is derived for the case where the burned gas remains inside the cylinder 11a without flowing through the EGR passage 51, in other words, when the internal EGR is utilized and the engine 1 is operated while a G/F is kept in between 30 to 60 (i.e., around 45). By setting the EGR ratio higher than the minimum value, the self-ignition conditions are satisfied. Here, "G" indicates a mass of the total gas (burned gas+new air) inside the cylinder, and "F" indicates a fuel amount (mass) to be supplied to the cylinder. The G/F is one of the parameters relating to the cylinder internal temperature (combustion temperature) and the EGR ratio, and the setting of the G/F to be within 30 to 60, that is around 45, is suitable considering, for example, the exhaust emission performance of soot and NOx. Note that, setting the G/F to be around 45 corresponds to setting an excess air ratio $\lambda$ to be slightly leaner than $\lambda$=1.1.

By setting the EGR ratio higher than the minimum value, the amount of the burned gas to be introduced into the cylinder 11a becomes higher than a predetermined amount and the increase amount of the temperature of the cylinder at the end of the compression stroke can be higher than a predetermined amount. Thereby, the self-ignition conditions can be satisfied. Here, the self-ignition conditions required in the calculation of the minimum value is set with respect to fuel with the worst ignitability (fuel with the lowest cetane number, that is fuel with a cetane number=40). Thereby, the ignition conditions can be satisfied even when the fuel with the lowest cetane number is used. Note that, when fuel with higher cetane number is used, the self-ignition conditions correspondingly become easier to be met and naturally be satisfied.

Here, the minimum value indicated by Equation (4a) decreases as the geometric compression ratio ε increases and the value increases as the geometric compression ratio ε decreases. That is, because the temperature of the cylinder at the end of the compression stroke increases as the geometric compression ratio ε increases, the minimum temperature increase amount required to satisfy the self-ignition conditions decreases, and therefore, the amount of the required burned gas decreases and the EGR ratio decreases. On the other hand, because the temperature of the cylinder at the end of the compression stroke decreases as the geometric compression ratio ε decreases, the minimum temperature increase amount required to satisfy the self-ignition conditions increases, as therefore, the amount of the required burned gas increases and the EGR ratio increases.

Further, the increased EGR ratio increases the ratio of the burned gas with high temperature and it may be advantageous in increasing the temperature of the cylinder at the end of the compression stroke. However, increasing the amount of the burned gas reduces the amount of the new air to be introduced into the cylinder 11a as well. Therefore, a maximum value of the EGR ratio may be set in view of securing the amount of the new air required to operate the engine 1 with a predetermined excess air ratio λ. The thick solid line at the EGR ratio=60% in FIG. 4 indicates the maximum value of the EGR ratio which is set to maintain the excess air ratio λ=1.1 with a load variation of the engine body due to, for example, acceleration taken into account. The maximum value of the EGR ratio is constant regardless of the geometric compression ratio of the engine 1 since there is no relation therebetween.

Therefore, in the case of utilizing the internal EGR, based on Equation (4a), if the EGR ratio [%] is set to satisfy Statement (4):

$$9 \times (15-\epsilon)+18 \leq \text{EGR ratio} \leq 60[\%] \tag{4}$$

the engine 1 satisfies the self-ignition conditions even with the low compression ratio, and the ignitability of the fuel can be surely secured regardless of the operating state of the engine 1 and the property of the fuel.

Compared to the case of utilizing the internal EGR as above, in the case of utilizing the external EGR, the temperature of the burned gas decreases because of the release of its heat while flowing through the EGR passage, and the amount of the EGR gas required to secure the ignitability accordingly increases. That is, the minimum value of the EGR ratio increases. In FIG. 4, Equation (5a):

$$y=12 \times (15-\epsilon)+22 \tag{5a}$$

is for obtaining the minimum value of the EGR ratio in the case of forming, as shown in FIG. 3, the shortest possible EGR passage 51 within the cylinder head 12 and utilizing the external EGR gas. The passage length of the EGR passage 51 of this embodiment is about 200 to 250 mm. The Equation (5a) is derived by assuming that, when a characteristic in temperature increase based on the relation between the EGR ratio (x) and the temperature increase inside the cylinder 11a (y) in the case of utilizing the internal EGR described above is expressed by a primary function with a predetermined slope (a), (y=ax), the amount of the temperature increase inside the cylinder 11a decreases to 75% (the inclination becomes 0.75×a) compared to the internal EGR due to the release of heat described above. Through comparing Equations (4a) and (5a), as described above, in the case of utilizing the external EGR, the minimum value of the EGR ratio becomes higher compared to the case of utilizing the internal EGR, and further if the EGR passage 51 shown in FIG. 3 is used, the PCM 10 controls the EGR control valve 51a to satisfy, $$12 \times (15-\epsilon)+22 \leq \text{EGR ratio} \leq 60[\%] \tag{5}$$

thereby, although the engine 1 has the low compression ratio, the self-ignition conditions are satisfied and the ignitability of the fuel can be surely secured regardless of the operating state of the engine 1 and the property of the fuel.

Further, as a comparative example, Equation (6a) in FIG. 4:

$$y=36 \times (15-\epsilon)+30 \tag{6a}$$

is for obtaining the minimum value of the EGR ratio in the case where, as indicated by the one-dot chain line in FIG. 3, the EGR passage 52 is provided outside the engine 1, in other words, the configuration with the conventional EGR passage is used. In this case, the EGR passage 52 being exposed outside together with the passage length thereof being comparatively long, about 800 to 1,000 mm, cause the release amount of heat to increase and the temperature of the burned gas greatly decreases. Thus, Equation (6a) for the configuration with the conventional EGR passage is established by assuming that the temperature increase amount of the cylinder 11a decreases to 25% (inclination becomes 0.25×a) compared to the internal EGR due to the release of heat. Therefore, for the configuration with the conventional EGR passage, the EGR ratio needs to be set to satisfy, $$36 \times (15-\epsilon)+30 \leq \text{EGR ratio} \leq 60[\%] \tag{6}$$

Here, as it is clear with reference to FIG. 4, with the engine 1 where its geometric compression ratio is 14:1 or below, the ignitability cannot be secured regardless of the value of the EGR ratio. That is, in the engine 1 where its geometric compression ratio is comparatively low, the configuration with the conventional external EGR passage is not effective in securing the ignitability. In other words, the configuration with at least a part of the EGR passage formed within the engine 1, such as the EGR passage 51 shown in FIG. 3, and/or the configuration in which the passage length of the EGR passage is shortened to suppress the temperature decrease of the burned gas and the high temperature burned gas is introduced into the cylinder 11a can be effectively used in securing the ignitability of the diesel engine 1 with comparatively low compression ratio under the particular operating state where the engine load and the engine speed are low.

Meanwhile, in the case where the ignitability in the diesel engine 1 is to be secured by using the external EGR gas as described above, the ignitability is influenced by an external ambient temperature and the release amount of heat in the EGR passage changes according to a change in external ambient temperature, therefore, the influence thereof on the ignitability becomes greater. Furthermore, in the case where the comparatively large amount of burned gas is to be introduced into the cylinder 11a of the engine 1 with comparatively low compression ratio, the temperature decrease of the burned gas due to the low external ambient temperature may more greatly influence the ignitability. For example, FIG. 5 shows a relation of the minimum value of the EGR ratio with respect to the geometric compression ratio ε of the engine 1 when the external ambient temperature is changed to respective temperatures, −30° C., −10° C. and 10° C., in the case where the EGR passage 51 shown in FIG. 3 is used. Because the ignitibility degrades as the external ambient temperature decreases, the minimum value of the EGR ratio required for securing the ignitability becomes larger. Here, if the external ambient temperature is set to be the parameter T, Equation (5a) is revised as, $$y=(10-\alpha)\times(15-\epsilon)+20-\alpha \quad (5b).$$

Note that, $\alpha=0.2\times T$ [°C]. Therefore, in the case where the EGR passage 51 shown in FIG. 3 is used, by setting the EGR control valve 51a so that the EGR ratio satisfies, $$(10-\alpha)\times(15-\epsilon)+20-\alpha \leq \text{EGR ratio} \leq 60[\%] \quad (1),$$

in the low compression ratio engine 1, the ignitability can be surely secured regardless of the value of the change in external ambient temperature.

Figure 6:
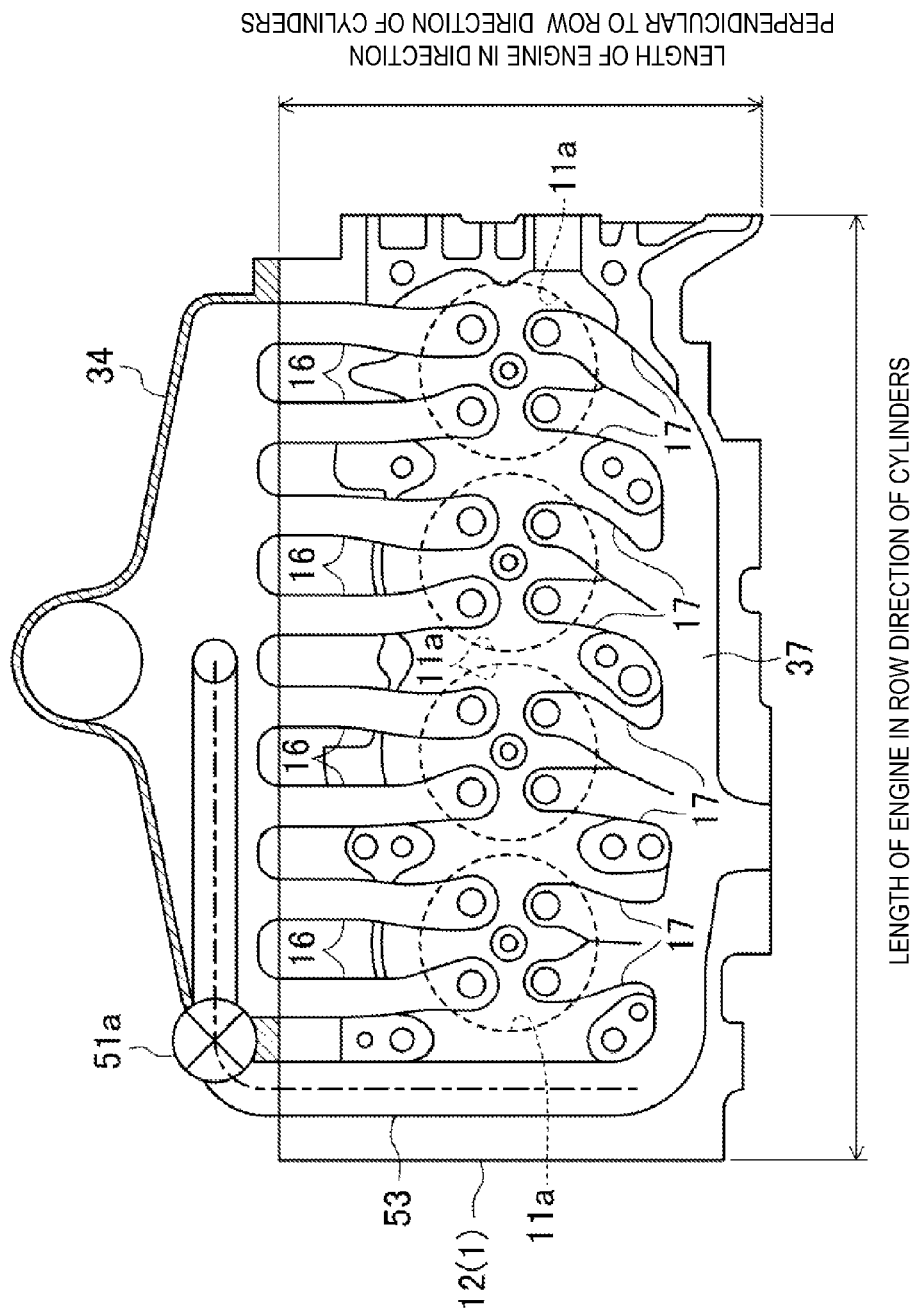
FIG. 6 is a view corresponding to FIG. 3 with another example of the EGR passage different from that in FIG. 3.

Note that, the configuration of the EGR passage 51 is not limited to the configuration shown in FIG. 3, and may adopt other configurations, such as the one shown in FIG. 6. In this example configuration, the EGR passage is not arranged at the position corresponding to between the second and third cylinders, but a part of an EGR passage 53 is arranged in a rear end part of the cylinder head 12 (left-end part in the FIG. 6). That is, similar to the configuration of the engine 1 shown in FIG. 3, the EGR passage 53 extends in the row direction of the cylinders from the rear end of the exhaust manifold 37 formed within the cylinder head 12, toward the intake side through the side along the fourth cylinder, and further to substantially the center position of the intake manifold 34. In such an EGR passage 53, as illustrated in FIG. 6, the EGR control valve 51a may be arranged in its corner part on the intake side of the cylinder head 12. In the example configuration of FIG. 6, although the length of the EGR passage 53 is set to be about 400 to 450 mm, which although is shorter than the length of the engine 1 in the row direction of the cylinders, it is longer than the EGR passage 51 shown in FIG. 3. Further, with the part of the EGR passage 53 formed outside the cylinder head 12, compared to the example configuration in FIG. 3, the release amount of heat from the burned gas while flowing through the EGR passage 53 may increase. However, when comparing to the configuration with the conventional EGR passage 52 shown virtually in FIG. 3, because the release amount of heat is significantly suppressed, as described above, the sure ignitability can be secured in the engine 1 with the comparatively low geometric compression ratio under the particular operating state where the engine load and the engine speed are low.

Note that, as another example of the EGR passage to be formed inside the cylinder head 12, for example, a configuration such that the ports on the exhaust and intake sides are connected to each other may be adopted (the illustration thereof is omitted in the drawings).

Second Embodiment

In the first embodiment, the desired EGR ratio is achieved by introducing the burned gas into the cylinder 11a via either one of the EGR passages 51 and 53, and thereby the ignitability is secured. Alternatively, the desired EGR ratio can be achieved and the ignitability can be secured by using the internal EGR gas. Although various kinds of methods may be adopted in achieving the internal EGR, here, the internal EGR is achieved by an advanced closure of the exhaust valve 22. That is, a negative overlap period in which the intake and exhaust valves 21 and 22 are both closed on the exhaust and intake strokes is set, so as to leave a part of the burned gas within the cylinder 11a.

In the second embodiment, an exhaust shutter valve 43 illustrated virtually in FIGS. 1 and 2 is arranged in the exhaust passage 40 between the exhaust emission control device 41 and the silencer 42. An opening of the exhaust shutter valve 43 is controlled by the PCM 10. The exhaust shutter valve 43 is normally opened, however in this embodiment, as described below, it may be closed in the particular operating state where the engine load and the engine speed are low (including the time of starting the engine). Further, in this embodiment, the EGR passage 52 with the conventional configuration which is shown virtually in FIG. 3 is provided in alternative to the EGR passages 51 and 53 formed inside the cylinder head 12 as shown in FIGS. 3 and 6. Note that, instead, either one of the EGR passages 51 and 53 formed inside the cylinder head 12 as shown in FIGS. 3 and 6 may be used.

FIG. 7 is a contour chart relating to the increase amount ($\Delta T$) of the temperature of the cylinder at the end of the compression stroke according to a relation between the geometric compression ratio $\epsilon$ (horizontal axis) and the closing timing of the exhaust valve 22 (vertical axis). Here, the closing timing of the exhaust valve 22 is indicated by BTDC°CA with respect to the exhaust top dead center. The valve closing timing may be defined as, in a lift curve of the exhaust valve 22 partitioned into an open ramp part, a bell curve part, and a close ramp part, a switching point between the bell curve part and the close ramp part. More specifically, a lift point of 0.5 mm may be set as the closing timing of the exhaust valve 22. Thereby, because the exhaust valve 22 closes earlier as the closing timing thereof is advanced (as the value along the vertical axis increases) and the amount of the burned gas remaining inside the cylinder 11a increases, therefore the EGR ratio increases. That is, advancing the closing timing of the exhaust valve 22 is beneficial in increasing the temperature of the cylinder at the end of the compression stroke, and, on the other hand, delaying the closing timing of the exhaust valve 22 delays the closing timing thereof (as the value along the vertical axis is smaller) and the amount of the burned gas remaining inside the cylinder 11a decreases, and therefore, the EGR ratio decreases.

In FIG. 7, the solid line where the closing timing of the exhaust valve 22 is 80 BTDC°CA is, as described above, a closing timing corresponding to the maximum value of the EGR ratio in a case where the engine 1 is operated with the excess air ratio $\lambda=1.1$. Further, in FIG. 7, the following Equation (2a), $$y=16\times(15-\epsilon)+20 \quad (2a),$$

is for obtaining the minimum value of the closing timing of the exhaust valve 22. The minimum value is a value under a condition in which the throttle valve 36 is not throttled and the exhaust shutter valve 43 is not closed. Because a negative pressure of the intake air is decreased by not throttling the throttle valve 36, an amount of the external EGR gas to be introduced into the cylinder 11a via the EGR passage 52 decreases relatively. Therefore, an amount of the internal EGR gas needs to be increased so as to achieve the requested EGR ratio. Further, under the condition in which the exhaust shutter valve 43 is not closed, because a back pressure of the engine 1 is low, a required amount of burned gas cannot remain inside the cylinder 11a unless the closing timing of the exhaust valve 22 is advanced. Therefore, under the condition in which the throttle valve 36 is not throttled and the exhaust shutter valve 43 is not closed, the closing timing of the exhaust valve 22 is set to be comparatively early.

Further, in FIG. 7, the following Equation (7):

$$y=6\times(15-\epsilon)+10 \quad (7),$$

is for obtaining the minimum value of the closing timing of the exhaust valve 22 when assuming the pressure on the exhaust side is at a theoretical critical pressure. Meanwhile, as a practical case, the minimum value of the closing timing of the exhaust valve 22 in a case where the exhaust shutter valve 43 is closed to an extent that the exhaust gas leaks therefrom (in other words, the exhaust shutter valve 43 is partly opened, hereinafter, this state is simply referred to as the exhaust shutter valve 43 is closed) is indicated in FIG. 7 as, $$y=10\times(15-\epsilon)+15 \quad (3a).$$

Through comparing Equations (2a) and (3a), because, by closing the exhaust shutter valve 43 to increase the back pressure of the engine 1, the amount of the burned gas remaining inside the cylinder increases even with the closing timing of the exhaust valve 22 being the same, the case where the exhaust shutter valve 43 is closed can have the minimum value of the closing timing of the exhaust valve 22 to be delayed compared to the case where the exhaust shutter valve 43 is opened. This is particularly beneficial because the EGR ratio needs to be increased as the geometric compression ratio of the engine 1 becomes lower. That is, the closing timing of the exhaust valve 22 on the advance side is regulated to a predetermined timing by a restriction based on the mechanisms of the VVTs 71 on the intake and exhaust sides, respectively. Moreover, the closing timing of the exhaust valve 22 on the advance side is regulated to a predetermined timing based on the shape of a bottom surface of the cylinder head 12 and the shape of the combustion chamber, which is the shape of the top surface of the piston 14, so as to avoid interference between the exhaust valve 22 and the piston 14. Here, the limit of the closing timing of the exhaust valve 22 is, for example, assumed to be 40 BTDC°CA. In this case, in the engine where the geometric compression ratio $\epsilon$ is, for example, 14:1, because the minimum value based on Equation (2a) becomes 40 BTDC°CA or below, the desired temperature of the cylinder at the end of the compression stroke can be achieved by the control of the closing timing of the exhaust valve 22 without closing the exhaust shutter valve 43 (or without the exhaust shutter valve 43 being provided), and thereby, the ignitability can be surely secured. On the other hand, in the engine where the geometric compression ratio $\epsilon$ is, for example, 13:1, because the minimum value based on Equation (2a) exceeds 40 BTDC°CA, the desired temperature of the cylinder at the end of the compression stroke cannot be achieved by only the control of the closing timing of the exhaust valve 22. Here, closing the exhaust shutter valve 43 and lowering the minimum value of the requested closing timing is extremely beneficial in securing the ignitability. That is, particularly in the engine 1 where the geometric compression ratio is low, the combination of the control of the exhaust shutter valve 43 and the control of the closing timing of the exhaust valve 22 is beneficial in securing the ignitability in the particular operating state where the engine load and the engine speed are low.

Therefore, under the condition where the exhaust shutter valve 43 is opened, the closing timing of the exhaust valve 22 may be controlled to satisfy, $$16\times(15-\epsilon)+20\leq\theta\leq80[BTDC°CA] \quad (2)$$

based on Equation (2a). On the other hand, under the condition where the exhaust shutter valve 43 is closed, the closing timing of the exhaust valve 22 may be controlled to satisfy, $$10\times(15-\epsilon)+15\leq\theta\leq80[BTDC°CA] \quad (3)$$

based on Equation (3a).

Note that, when using the internal EGR gas as above, because the comparatively large amount of burned gas is introduced into the cylinder 11a and, therefore, the ratio of the new air is comparatively low and the heat loss of the burned gas is negligible, the influence from the external ambient temperature on the ignitability is comparatively small. That is, even if the external ambient temperature changes, the change in the minimum value of the closing timing of the exhaust valve 22 is comparatively small.

As described above, by setting the EGR ratio within the predetermined range through the control of the EGR control valve 51a and setting the closing timing of the exhaust valve 22 to a predetermined timing, in the diesel engine 1 with comparatively low compression ratio, such as between 12:1 and 15:1, even if the fuel with a low cetane number of which the ignitability is low is supplied, the ignitability can be surely secured regardless of the operation range of the engine 1. Therefore, a slow combustion due to the reduction of the compression ratio of the diesel engine 1 can be achieved, the NOx discharge amount can be reduced or prevented, the soot generation is suppressed and the exhaust emission performance can be improved. As a result, the NOx catalyst may be unnecessary. Further, the reduction of the compression ratio of the engine 1 reduces a mechanical resistance loss and improves a thermal efficiency, and further improves a fuel consumption.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Diesel Engine (Engine Body)
10 PCM (Controller)
11a Cylinder
12 Cylinder Head
17 Exhaust Port (Exhaust Passage)
22 Exhaust Valve
30 Intake Passage
34 Intake Manifold (Intake Passage)
37 Exhaust Manifold (Exhaust Passage)
43 Exhaust Shutter Valve (Exhaust Throttle Valve)
51 EGR Passage
51a EGR Control Valve
53 EGR Passage

The invention claimed is:
1. A diesel engine for a vehicle, comprising:
an engine body to be mounted in the vehicle and having a cylinder to be supplied with fuel containing diesel fuel as its main component, a geometric compression ratio $\epsilon$ of the cylinder being set within a range of 12:1 to 15:1; and
an EGR system for allowing a part of burned gas to exist inside the cylinder of the engine body when the engine body is at least in a particular operating state where an engine load and an engine speed are relatively low,
wherein the EGR system includes an EGR passage at least partially formed inside the engine body, for re-circulating into an intake passage a part of the burned gas inside an exhaust passage, and having a predetermined or shorter passage length, an EGR control valve provided in a course of the EGR passage and for adjusting a flow rate of the burned gas inside the EGR passage, and a controller for controlling an opening of the EGR control valve,
wherein in the particular operating state, the engine body is operated so that a relation between a mass of total gas

(G) inside the cylinder and a mass of the fuel (F) to be supplied inside the cylinder (G/F) satisfies 30≤G/F≤60, and wherein when the engine body is in the particular operating state, the controller controls the opening of the EGR control valve so that an EGR ratio [%] defined by a volume ratio of the burned gas with respect to the entire gas inside the cylinder (burned gas amount/total gas amount inside the cylinder) satisfies, (10−α)×(15−ε)+20−α≤EGR ratio≤60[%]

(here, α=0.2×external temperature [° C.])
with respect to the geometric compression ratio ε of the engine body.

2. The diesel engine of claim 1, wherein the EGR ratio is calculated as follows:

EGR ratio=$CO_2$ concentration in intake air/$CO_2$ concentration in exhaust gas×100[%].

3. The diesel engine of claim 1, wherein a part of the exhaust passage is formed inside the engine body, and
wherein the EGR passage is connected with the exhaust passage formed inside the engine body.

4. The diesel engine of claim 3, wherein the cylinder of the engine body includes a plurality of cylinders aligned in series, and
the length of the EGR passage is set to a length of the cylinders in their aligned direction of the engine body or shorter.

5. A diesel engine for a vehicle, comprising:
an engine body to be mounted in the vehicle and having a cylinder to be supplied with fuel containing diesel fuel as its main component, a geometric compression ratio ε of the cylinder being set within a range of 12:1 to 15:1; and
an EGR system for allowing a part of burned gas to exist inside the cylinder of the engine body when the engine body is at least in a particular operating state where an engine load and an engine speed are relatively low,
wherein the EGR system includes an exhaust valve provided between an exhaust passage and the cylinder, and a controller for controlling opening and closing timings of the exhaust valve, and wherein the controller sets the closing timing of the exhaust valve to be during an exhaust stroke that is advanced by a predetermined crank angle from its top dead center, so as to leave the part of the burned gas inside the cylinder,
wherein in the particular operating state, the engine body is operated so that a relation between a mass of total gas (G) inside the cylinder and a mass of the fuel (F) to be supplied inside the cylinder (G/F) satisfies 30≤G/F≤60, and
wherein when the engine body is in the particular operating state, the controller controls the closing timing θ [BTDC°CA] of the exhaust valve to satisfy,

16×(15−ε)+20≤θ≤80[BTDC°CA]

with respect to the geometric compression ratio ε of the engine body.

6. The diesel engine of claim 5, wherein an exhaust throttle valve is arranged in the exhaust passage, and
wherein when the engine body is in the particular operating state and the exhaust throttle valve is closed to a predetermined opening, the controller controls the closing timing θ [BTDC°CA] of the exhaust valve to satisfy,

10×(15−ε)+15≤θ≤80[BTDC°CA]

with respect to the geometric compression ratio ε of the engine body.

7. A method of controlling an EGR ratio of a diesel engine for a vehicle, the engine including:
an engine body to be mounted in the vehicle and having a cylinder to be supplied with fuel containing diesel fuel as its main component, a geometric compression ratio ε of the cylinder being set within a range of 12:1 to 15:1; and
an EGR system for allowing a part of burned gas to exist inside the cylinder of the engine body when the engine body is at least in a particular operating state where an engine load and an engine speed are relatively low,
wherein the EGR system includes an EGR passage at least partially formed inside the engine body, for re-circulating into an intake passage a part of the burned gas inside an exhaust passage, and having a predetermined or shorter passage length, an EGR control valve provided in the course of the EGR passage and for adjusting a flow rate of the burned gas inside the EGR passage, and a controller for controlling an opening of the EGR control valve,
wherein the method comprising:
operating the engine body in the particular operating state so that a relation between a mass of total gas (G) inside the cylinder and a mass of the fuel (F) to be supplied inside the cylinder (G/F) satisfies 30≤G/F≤60; and
when the engine body is in the particular operating state, causing the controller to control the opening of the EGR control valve so that an EGR ratio [%] defined by a volume ratio of the burned gas with respect to the entire gas inside the cylinder (burned gas amount/total gas amount inside the cylinder) satisfies, (10−α)×(15−ε)+20−α≤EGR ratio≤60[%]

(here, α=0.2×external temperature [° C.])
with respect to the geometric compression ratio ε of the engine body.

8. The method of claim 7, wherein the EGR ratio is calculated as follows:

EGR ratio=$CO_2$ concentration in intake air/$CO_2$ concentration in exhaust gas×100[%].

9. The method of claim 7, wherein a part of the exhaust passage is formed inside the engine body, and
wherein the EGR passage is connected with the exhaust passage formed inside the engine body.

10. The method of claim 9, wherein the cylinder of the engine body includes a plurality of cylinders aligned in series, and
the length of the EGR passage is set to a length of the cylinders in their aligned direction of the engine body or shorter.

11. A method of controlling an EGR ratio of a diesel engine for a vehicle, the engine including:
an engine body to be mounted in the vehicle and having a cylinder to be supplied with fuel containing diesel fuel as its main component, a geometric compression ratio ε of the cylinder being set within a range of 12:1 to 15:1; and
an EGR system for allowing a part of burned gas to exist inside the cylinder of the engine body when the engine body is at least in a particular operating state where an engine load and an engine speed are relatively low,
wherein the EGR system includes an exhaust valve provided between an exhaust passage and the cylinder, and a controller for controlling opening and closing timings of the exhaust valve, and wherein the controller sets the closing timing of the exhaust valve to be during an exhaust stroke that is advanced by a predetermined crank angle from its top dead center, so as to leave the part of the burned gas inside the cylinder, wherein the method comprising:
operating the engine body in the particular operating state so that a relation between a mass of total gas (G) inside the cylinder and a mass of the fuel (F) to be supplied inside the cylinder (G/F) satisfies $30 \leq G/F \leq 60$; and when the engine body is in the particular operating state, causing the controller to control the closing timing $\theta[BTDC°CA]$ of the exhaust valve to satisfy, $$16\times(15-\epsilon)+20 \leq \theta \leq 80[BTDC°CA]$$

with respect to the geometric compression ratio $\epsilon$ of the engine body.

12. The method of claim 11, wherein an exhaust throttle valve is arranged in the exhaust passage, and wherein when the engine body is in the particular operating state and the exhaust throttle valve is closed to a predetermined opening, the controller controls the closing timing $\theta$ [BTDC°CA] of the exhaust valve to satisfy, $$10\times(15-\epsilon)+15 \leq \theta \leq 80[BTDC°CA]$$

with respect to the geometric compression ratio $\epsilon$ of the engine body.

* * * * *